(12) United States Patent
Kuriki (10) Patent No.: US 8,404,001 B2
(45) Date of Patent: Mar. 26, 2013

(54) METHOD FOR MANUFACTURING POSITIVE ELECTRODE AND POWER STORAGE DEVICE

(75) Inventor: Kazutaka Kuriki, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 13/435,127

(22) Filed: Mar. 30, 2012

(65) Prior Publication Data

US 2012/0260478 A1 Oct. 18, 2012

(30) Foreign Application Priority Data

Apr. 15, 2011 (JP) ................. 2011-090685

(51) Int. Cl.
*H01G 9/00* (2006.01)
(52) U.S. Cl. ................................. 29/25.03
(58) Field of Classification Search .............. None
See application file for complete search history.

(56) References Cited

U.S. PATENT DOCUMENTS 7,862,927 B2 * 1/2011 Krasnov et al. ............... 429/162
2004/0258984 A1 12/2004 Ariel et al.

FOREIGN PATENT DOCUMENTS

JP 2009-295514 12/2009

OTHER PUBLICATIONS

Přidal et al., "Thin Film Components for Li-ion Microbatteries", http://www.ababrno.cz/starsi_rocniky/aba2001/abstracts/03.pdf, ABA 2001:Advanced Batteries and Accumulators, Jul. 17-21, 2001, pp. 3-1-3-7.
Prachařová[a], et al., "LicoO$_2$ Thin-Film Cathodes Grown by RF Sputtering", Journal of Power Sources, 2002, vol. 108, pp. 204-212.

* cited by examiner

*Primary Examiner* — Seahvosh Nikmanesh
(74) *Attorney, Agent, or Firm* — Nixon Peabody LLP; Jeffrey L. Costellia (57) ABSTRACT

To suppress decomposition of lithium cobalt oxide and formation of a decomposition product. To suppress the reaction between oxygen in lithium cobalt oxide and a current collector. To obtain a power storage device having high charge and discharge capacity. In a method for manufacturing a power storage device, in forming a lithium cobalt oxide layer over a positive electrode current collector by a sputtering method using a target containing lithium cobalt oxide and a sputtering gas containing Ar, the positive electrode current collector is heated at a temperature at which c-axes of crystals of lithium cobalt oxide are aligned and cobalt oxide is not formed. The heating temperature of the positive electrode current collector is higher than or equal to 400° C. and lower than 600° C.

19 Claims, 11 Drawing Sheets

METHOD FOR MANUFACTURING POSITIVE ELECTRODE AND POWER STORAGE DEVICE

BACKGROUND OF THE INVENTION

1. Field of the Invention

The disclosed invention relates to a method for manufacturing a positive electrode and a power storage device.

Note that the power storage device indicates every element and every device which have a function of storing power.

2. Description of the Related Art

In recent years, power storage devices such as lithium-ion secondary batteries and lithium-ion capacitors have been developed.

With the development of power storage devices, as a positive electrode active material of lithium-ion secondary batteries, a material which can supply lithium stably has been developed.

For example, as a lithium supply source, a compound containing lithium (Li) and cobalt (Co), such as lithium cobalt oxide ($LiCoO_2$), is known (see Patent Document 1).

[Reference]

[Patent Document 1] Japanese Published Patent Application No. 2009-295514

SUMMARY OF THE INVENTION

In Patent Document 1, lithium cobalt oxide ($LiCoO_2$) formed by a pulsed laser deposition method is used as a positive electrode active material. Lithium cobalt oxide formed in Patent Document 1 is a single crystal thin film obtained through epitaxial growth while a substrate is heated to 600° C.

When the substrate over which lithium cobalt oxide is formed is heated at a high temperature, the lithium cobalt oxide is decomposed, resulting in formation of a decomposition product. In the case where the amount of the formed decomposition product is larger than that of the lithium cobalt oxide, the charge and discharge capacity of a power storage device might be reduced.

In the case where titanium is used as a positive electrode current collector and lithium cobalt oxide is formed over the current collector at a high temperature, oxygen in the lithium cobalt oxide reacts with the titanium in the positive electrode current collector, so that titanium oxide is formed. When titanium in a positive electrode current collector is oxidized to form titanium oxide, the resistance of the positive electrode current collector might be increased. Extraction of oxygen from lithium cobalt oxide might cause a crystal defect in the lithium cobalt oxide or change the crystal structure of the lithium cobalt oxide.

In view of the above problems, an object of one embodiment of the disclosed invention is to suppress decomposition of lithium cobalt oxide and formation of a decomposition product.

Another object of one embodiment of the disclosed invention is to suppress the reaction between oxygen in lithium cobalt oxide and a current collector.

Another object of one embodiment of the disclosed invention is to obtain a power storage, device having high charge and discharge capacity.

According to one embodiment of the disclosed invention, in a step of forming a positive electrode active material layer over a positive electrode current collector, a lithium cobalt oxide layer is formed as the positive electrode active material layer while the current collector is heated at a temperature in the range of higher than or equal to 400° C. and lower than 600° C. Thus, the lithium cobalt oxide layer which is crystalline and has c-axes aliened in the direction perpendicular to a surface of the current collector can be formed.

Since the lithium cobalt oxide layer is formed while the positive electrode current collector is heated at a low temperature higher than or equal to 400° C. and lower than 600° C., it is possible to suppress decomposition of lithium cobalt oxide. Suppression of decomposition of lithium cobalt oxide means that a decomposition product is not formed.

In addition, when the lithium cobalt oxide layer is formed while the positive electrode current collector is heated at a low temperature higher than or equal to 400° C. and lower than 600° C., it is possible to suppress the reaction between oxygen in lithium cobalt oxide and the current collector. Accordingly, an increase in resistance of the current collector can be suppressed. Further, it is possible to suppress occurrence of a crystal defect in the lithium cobalt oxide and the change of the crystal structure of the lithium cobalt oxide.

One embodiment of the disclosed invention is a method for manufacturing a power storage device. In forming a lithium cobalt oxide layer over a positive electrode current collector by a sputtering method using a target containing lithium cobalt oxide and a sputtering gas containing Ar, the positive electrode current collector is heated at a temperature at which c-axes of crystals of lithium cobalt oxide are aliened and cobalt oxide is not formed. The heating temperature of the positive electrode current collector is higher than or equal to 400° C. and lower than 600° C.

According to one embodiment of the disclosed invention, a material of the positive electrode current collector is any one of titanium, stainless steel, platinum, and aluminum.

According to one embodiment of the disclosed invention, decomposition of lithium cobalt oxide can be suppressed, resulting in suppression of formation of a decomposition product.

According to one embodiment of the disclosed invention, it is possible to suppress the reaction between oxygen in lithium cobalt oxide and the current collector.

According to another embodiment of the disclosed invention, a power storage device having high charge and discharge capacity can be obtained.

DETAILED DESCRIPTION OF THE INVENTION

Embodiments of the invention disclosed in this specification will be hereinafter described with reference to the accompanying drawings. Note that the invention disclosed in this specification can be carried out in a variety of different modes, and it is easily understood by those skilled in the art that the modes and the details of the invention disclosed in this specification can be changed in various ways without departing from the spirit and the scope thereof. Therefore, the present invention is not construed as being limited to description of the embodiments. Note that, in the drawings hereinafter shown, the same portions or portions having similar functions are denoted by common reference numerals, and repeated description thereof will be omitted.

Note that the position, the size, the range, or the like of each component illustrated in the drawings and the like is not accurately represented in some cases for the sake of simplicity. Therefore, the disclosed invention is not necessarily limited to the position, the size, the range, or the like disclosed in the drawings and the like.

In this specification and the like, ordinal numbers such as "first", "second", and "third" are used in order to avoid confusion among components, and the terms do not mean limitation of the number of components.

[Embodiment 1]

In this embodiment, a power storage device according to one embodiment of the present invention and a manufacturing method thereof will be described.

A power storage device according to this embodiment will be described with reference to FIG. 1. Here, a cross-sectional structure of a secondary battery as a power storage device will be described below.

Among secondary batteries, a lithium-ion battery formed using a lithium-containing metal oxide has high capacity and a high level of safety. Here, the structure of a lithium-ion battery, which is a typical example of secondary batteries, will be described.

Figure 1:
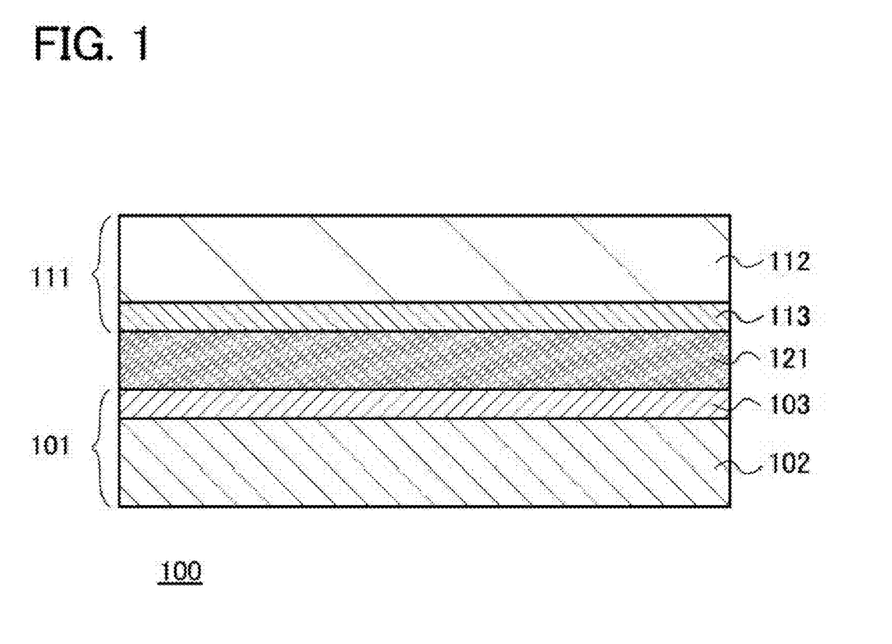
FIG. 1 is a cross-sectional view of a power storage device.

FIG. 1 is a cross-sectional view of a power storage device 100.

The power storage device 100 includes a negative electrode 101, a positive electrode 111, and an electrolyte 121 sandwiched between the negative electrode 101 and the positive electrode 111. In addition, the negative electrode 101 may include a negative electrode current collector 102 and a negative electrode active material layer 103. The positive electrode 111 may include a positive electrode current collector 112 and a positive electrode active material layer 113. A separator is impregnated with the electrolyte 121. The separator is in contact with the negative electrode active material layer 103 and the positive electrode active material layer 113.

The negative electrode current collector 102 and the positive electrode current collector 112 are connected to different external terminals. In addition, the negative electrode 101, the separator impregnated with the electrolyte 121, and the positive electrode 111 are covered with an exterior material not illustrated.

Note that the active material refers to a material that relates to intercalation and deintercalation of ions which function as carriers. When an electrode such as a positive electrode or a negative electrode is formed by a coating method, an active material layer is formed over the current collector with the use of a mixture of an active material having a surface over which a carbon layer is formed and other materials such as a conduction auxiliary agent, a binder, and a solvent in some cases. In this case, the active material and the active material layer are distinguished.

The positive electrode active material layer 113 is formed over the positive electrode current collector 112 so that the positive electrode 111 is formed. In addition, the negative electrode active material layer 103 is formed over the negative electrode current collector 102 so that the negative electrode 101 is formed. In the case where the negative electrode active material layer 103 has sufficient conductivity for doubling as the negative electrode current collector 102, the negative electrode active material layer 103 may be used alone as the negative electrode 101, as described below. The electrolyte 121 is sandwiched between the positive electrode active material layer 113 and the negative electrode active material layer 103, whereby the power storage device 100 is manufactured.

As described above, the separator may be impregnated with the electrolyte 121. In the case where the separator is not necessary as described below, instead of the separator, the electrolyte 121 itself is provided between the positive electrode 111 and the negative electrode 101, more specifically, between the positive electrode active material layer 113 and the negative electrode active material layer 103.

The positive electrode 111 included in the power storage device 100 in this embodiment will be described.

As the positive electrode current collector 112, a material having high conductivity such as titanium, stainless steel, platinum, aluminum, or copper can be used. Alternatively, a stack of some of the above materials having high conductivity may be used. The positive electrode current collector 112 can have a foil shape, a plate shape, a film shape, or the like as appropriate. In this embodiment, a titanium or stainless steel film with a thickness of 100 μm is used as the positive electrode current collector 112.

As the positive electrode active material layer 113, a lithium cobalt oxide ($LiCoO_2$) layer is used. The lithium cobalt oxide ($LiCoO_2$) layer is formed by a sputtering method while the positive electrode current collector 112 is heated at a temperature in the range of higher than or equal to 400° C. and lower than 600° C. In this case, by a sputtering method, the lithium cobalt oxide layer is formed to a thickness of 100 nm to 100 μm, inclusive, with the use of lithium cobalt oxide as a target, over the titanium or stainless steel film, used as the positive electrode current collector 112.

In this embodiment, the deposition was performed under the following conditions: a sputtering apparatus EB1000 manufactured by CANON ANELVA CORPORATION was used; the frequency was 13.56 MHz; the power was 30 W; the pressure was 0.5 Pa; the flow rate of argon (Ar) was 10 sccm; the distance between a substrate (the positive electrode current collector 112) and the target was 75 mm; and the substrate rotation speed was 5 rpm. As the temperature of the positive electrode current collector 112, the temperature of a heater which heats the positive electrode current collector 112 was measured.

In the case where the lithium cobalt oxide layer is formed by a sputtering method while the positive electrode current collector 112 is heated at a temperature in the range of higher than or equal to 400° C. and lower than 600° C., the obtained lithium cobalt oxide layer is crystalline and has c-axis orientation.

Figure 2:
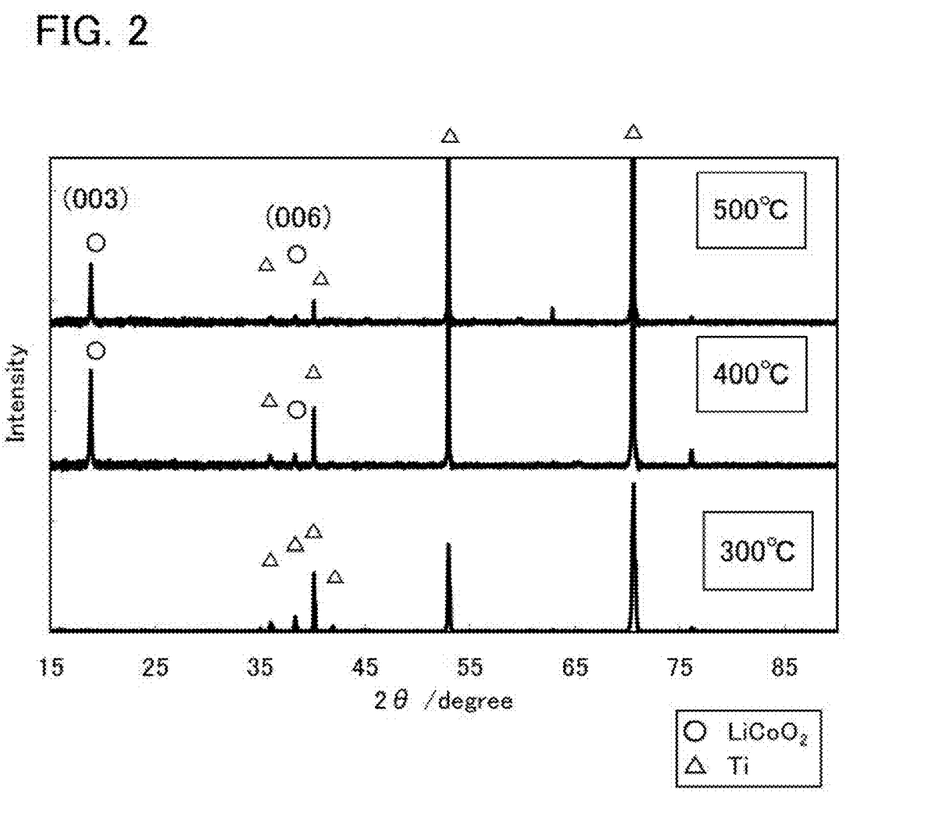
FIG. 2 is a graph showing results of XRD measurement.

FIG. 2 shows results of measurement by an X-ray diffractometer (XRD) in the case where titanium foil with a thickness of 100 μm was used as the positive electrode current collectors 112 and lithium cobalt oxide layers each with a thickness of 100 nm were formed as the positive electrode active material layers 113 while the positive electrode current collectors 112 were heated at 300° C., 400° C. and 500° C. In FIG. 2, circles (●) show peaks derived from lithium cobalt oxide, and triangles (●) show peaks derived from titanium.

FIG. 2 shows that the lithium cobalt oxide layers formed while the positive electrode current collectors 112 were heated at 400° C. and 500° C. each have a peak, of a (003)

plane and a peak of a (006) plane. These results reveal that the c-axes of the lithium cobalt oxide layers are aligned in the direction perpendicular to surfaces of the positive electrode current collectors 112.

In contrast, the lithium cobalt oxide layer formed while the positive electrode current collector 112 was heated at 300° C. does not have a peak of the (003) plane. That is, this result reveals that the c-axes of the lithium cobalt oxide layer formed while the positive electrode current collector 112 was heated at 300° C. are not aligned with respect to a surface of the positive electrode current collector 112.

Figure 3:
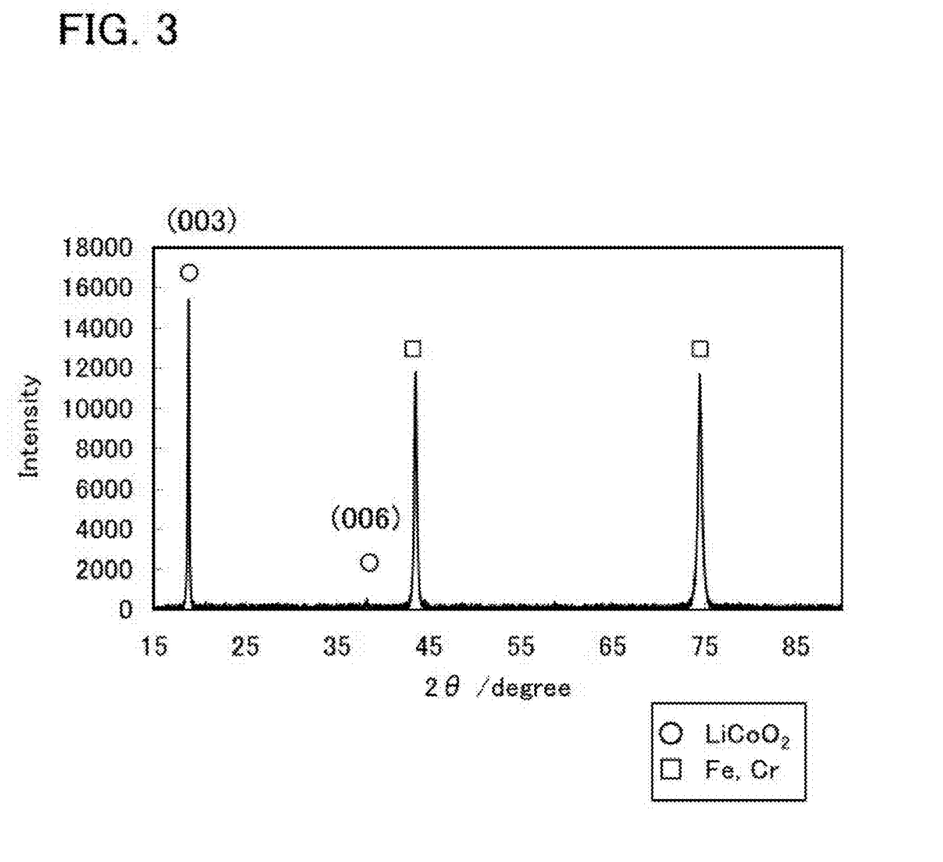
FIG. 3 is a graph showing results of XRD measurement.

FIG. 3 shows results of measurement by XRD in the case where stainless steel (SUS316L) was used as the positive electrode current collector 112.

In FIG. 3, a stainless steel film with a thickness of 100 μm was used as the positive electrode current collector 112, and a lithium cobalt oxide layer with a thickness of 300 nm was formed as the positive electrode active material layer 113 while the positive electrode current collector 112 was heated at 500° C.

FIG. 3 shows results of measurement of the lithium cobalt oxide layer by XRD. In FIG. 3, circles (●) show peaks derived from lithium cobalt oxide, and quadrangles (●) show peaks derived from iron (Fe) or chromium (Cr) contained in stainless steel.

As shown in FIG. 3, even when the positive electrode current collector 112 was a stainless steel film, a peak of the (003) plane and a peak of the (006) plane are observed in the lithium cobalt oxide layer. The result described above reveals that the c-axes of the lithium cobalt oxide layer are aligned in the direction perpendicular to a surface of the positive electrode current collector 112.

The XRD measurement described above reveals that the lithium cobalt oxide layers formed while the positive electrode current collectors 112 were heated at 400° C. and 500° C. each are crystalline and have c-axes aligned in the direction perpendicular to the surface of the positive electrode current collector 112. In addition, FIG. 2 shows that no peak of a decomposition product of lithium cobalt oxide is detected. This result reveals that the lithium cobalt oxide layers formed while the positive electrode current collectors 112 were heated at 400° C. and 500° C. were not decomposed due to heating and thus a decomposition product was not formed. Moreover, FIG. 2 shows that peaks derived from titanium are detected but no peak derived from titanium oxide is detected. This result reveals that reaction did not occur between the titanium film used as the positive electrode current collector 112 and the lithium cobalt oxide layer.

Figure 6A:
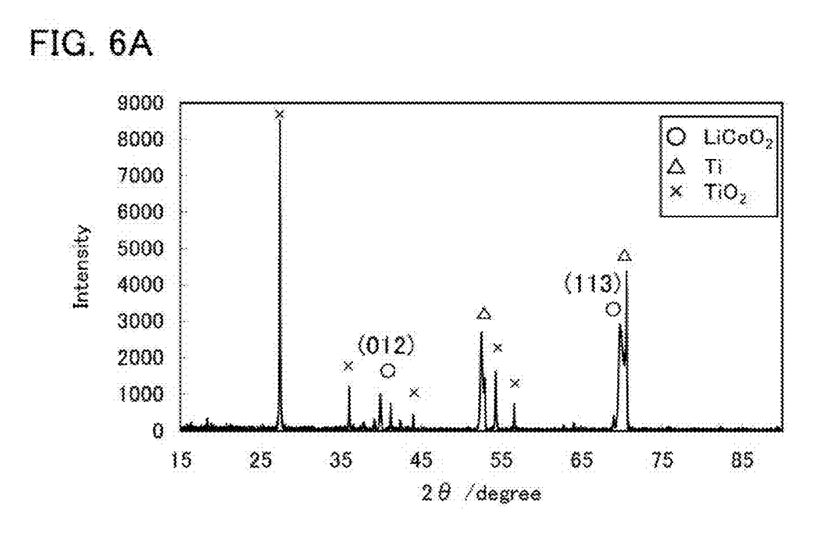
FIGS. 6A and 6B are graphs each showing results of XRD measurement.
Figure 6B:
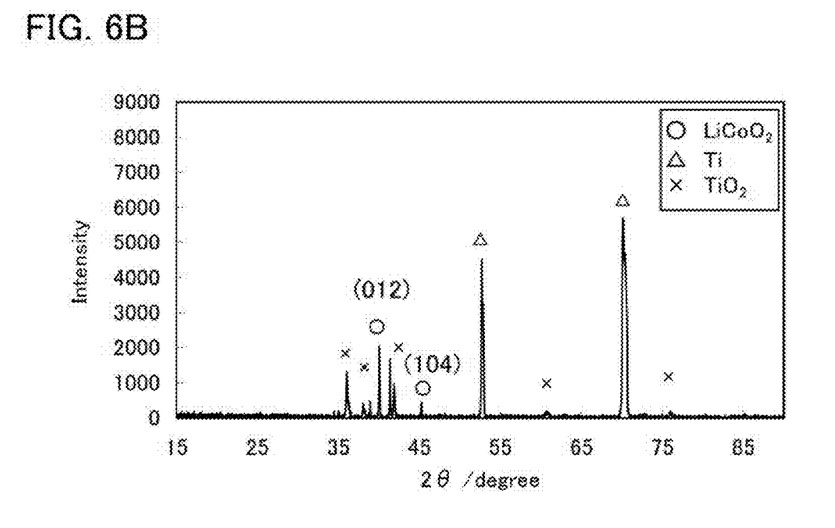

FIGS. 6A and 6B each show results of XRD measurement of a lithium cobalt oxide layer obtained by film formation without heating and heating at a high temperature (600° C.) after the film formation.

A titanium film with a thickness of 100 μm was used as the positive electrode current collector 112, and a lithium cobalt oxide layer with a thickness of 100 nm was formed as the positive electrode active material layer 113 while the positive electrode current collector 112 was not heated. FIG. 6A shows results of XRD measurement in the case where after the lithium cobalt oxide layer was formed, heating was performed in a nitrogen atmosphere or an argon atmosphere at 600° C. for 20 hours. FIG. 6B shows results of XRD measurement in the case where after the lithium cobalt oxide layer was formed, heating was performed in a vacuum atmosphere at 600° C. for 60 hours. In FIGS. 6A and 6B, circles (●) show peaks derived from lithium cobalt oxide, triangles (●) show peaks derived from titanium, and crosses (×) show peaks derived from titanium oxide ($TiO_2$).

FIG. 6A shows that a peak of a (012) plane and a peak of a (113) plane are detected. This result reveals that the c-axes of the lithium cobalt oxide are not aligned.

FIG. 6B shows that a peak of the (012) plane and a peak of a (104) plane are detected. This result reveals that the c-axes of the lithium cobalt oxide are not aligned.

Figure 8A:
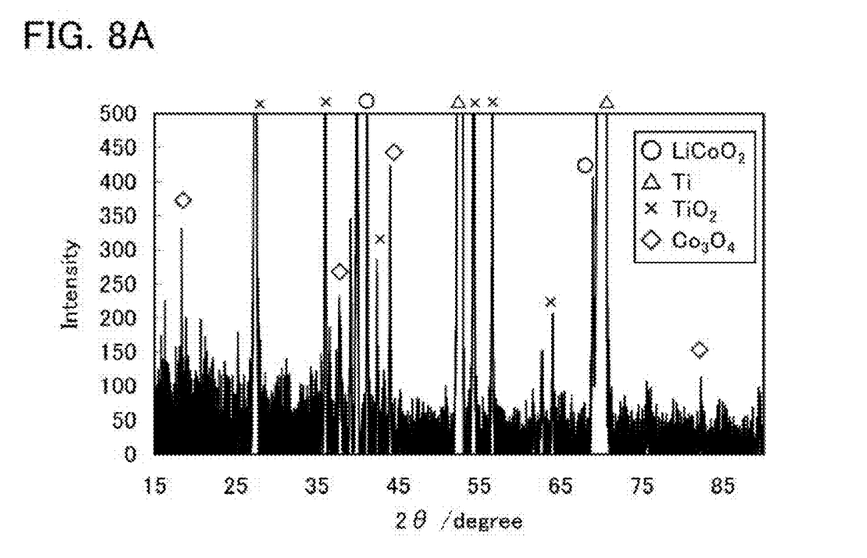
FIGS. 8A and 8B are graphs each showing results of XRD measurement.
Figure 8B:
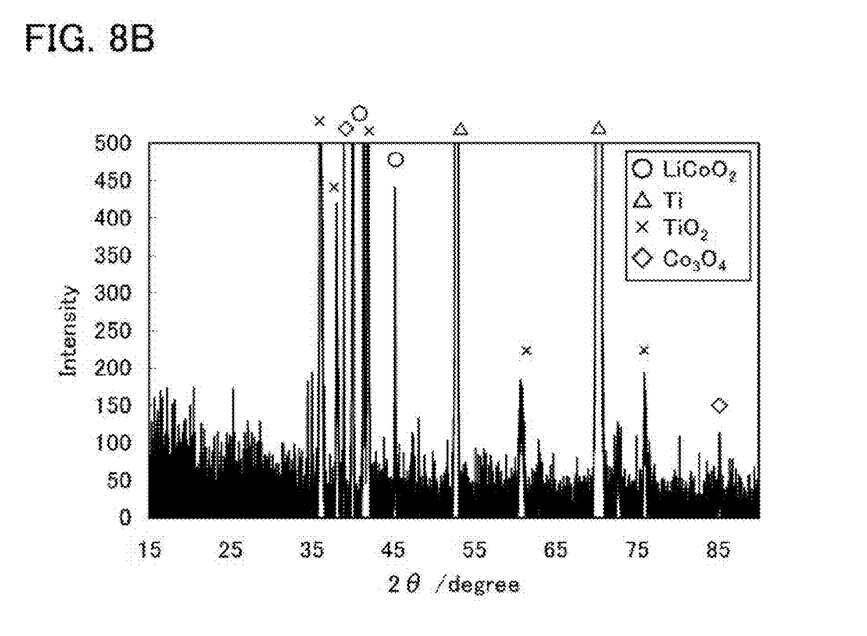

FIGS. 8A and 8B are enlarged graphs showing portions in the vicinity of an intensity of 0 in FIGS. 6A and 6B, respectively. In FIGS. 8A and 8B, rhombuses (●) show peaks derived from cobalt oxide ($Co_3O_4$).

As shown in FIGS. 8A and 8B, when lithium cobalt oxide is heated at 600° C., the lithium cobalt oxide is decomposed, so that cobalt oxide which is a decomposition product is formed. In the case where the decomposition product is thus formed and the amount of the formed decomposition product is larger than that of the lithium cobalt oxide, charge and discharge capacity might be reduced. Actual measurement results of charge and discharge capacity will be described later.

Further, in both FIGS. 6A and 6B, peaks derived from titanium oxide ($TiO_2$) are observed. As described above, the titanium oxide is obtained through reaction between oxygen in the lithium cobalt oxide and titanium of the current collector. When the titanium of the current collector is thus oxidized to form titanium oxide, the resistance of the current collector might be increased. Further, oxygen is extracted from the lithium cobalt oxide, so that a crystal defect might be caused in the lithium cobalt oxide or the crystal structure of the lithium cobalt oxide might be changed.

Thus, FIGS. 6A and 6B show that the lithium cobalt oxide heated at a high temperature (600° C.) was decomposed to form a decomposition product, does not have c-axis orientation, and reacted with titanium which is the current collector.

Figure 10:
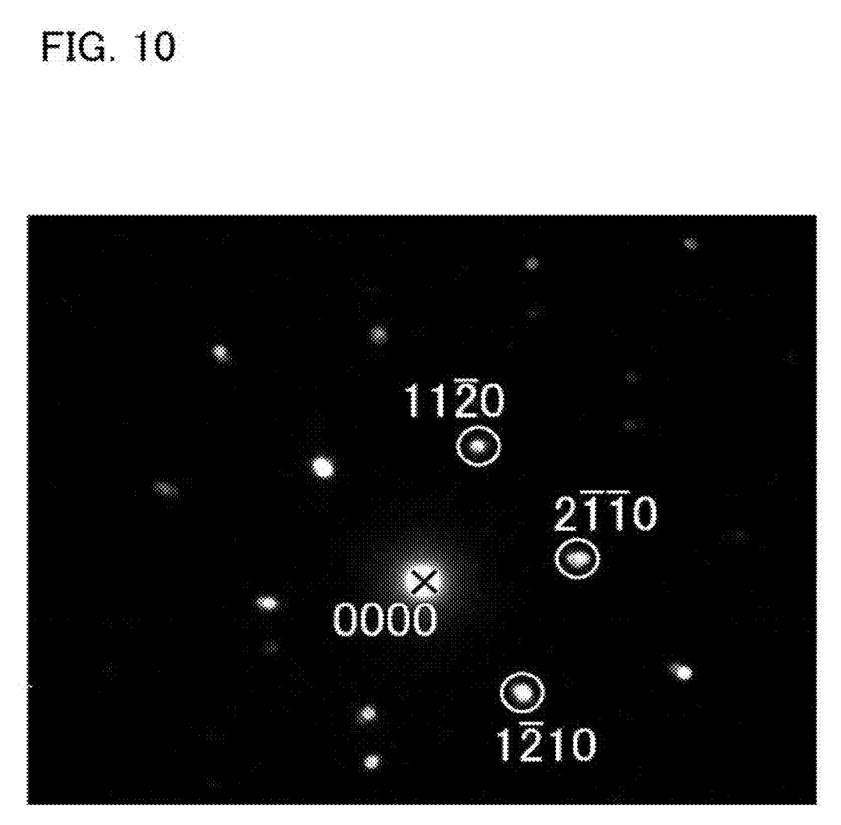
FIG. 10 shows a result of electron diffraction measurement.

FIG. 10 shows a result obtained by observation by electron diffraction of the positive electrode 111 in which a titanium (Ti) film with a thickness of 100 μm was used as the positive electrode current collector 112 and a lithium cobalt oxide ($LiCoO_2$) layer with a thickness of 300 nm was formed as the positive electrode active material layer 113 by a sputtering method while the positive electrode current collector 112 was heated at 500° C.

As shown in FIG. 10, the attributions and the incidence directions of electron diffraction spots were identified. The positional relation of three diffraction spots forming a parallelogram with a (000) spot as a starting point corresponds to that of diffraction spots obtained when observed from the [0001] direction. This result proves that the lithium cobalt oxide layer according to this embodiment has c-axis orientation.

Figure 4:
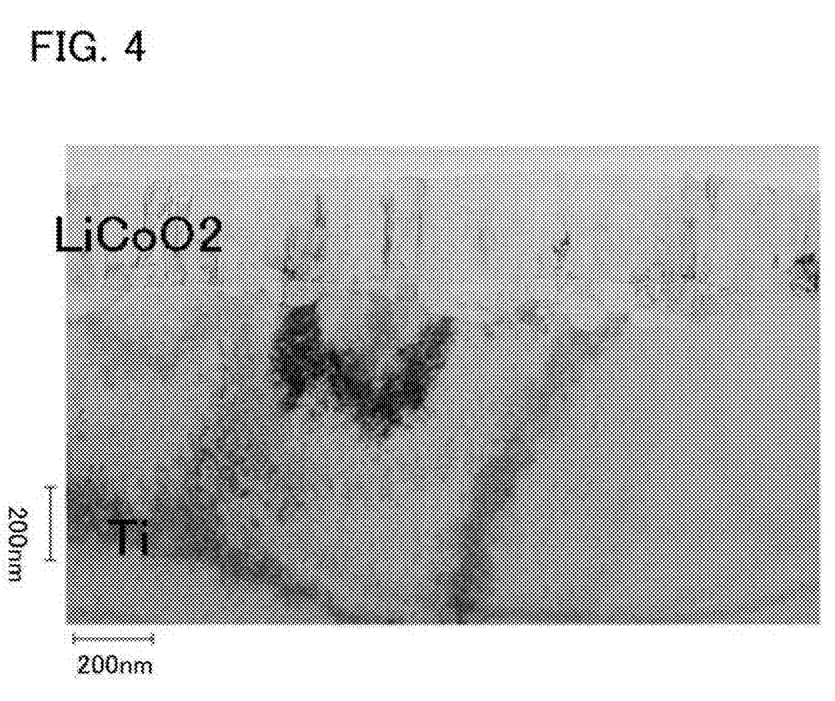
FIG. 4 is a photograph showing a result of observation by TEM.

FIG. 4 shows a result obtained by observing the positive electrode 111 formed in a manner similar to that of FIG. 10, with a transmission electron microscope (TEM).

In FIG. 4, columnar crystal particles of lithium cobalt oxide ($LiCoO_2$) grown in the direction perpendicular to a surface of a titanium (Ti) film can be observed.

As described above, according to this embodiment, decomposition of lithium cobalt oxide can be suppressed, resulting in suppression of formation of a decomposition product.

In addition, in this embodiment, it is possible to suppress the reaction between oxygen in lithium cobalt oxide and the current collector.

Next, the negative electrode 101 included in the power storage device 100 in this embodiment will be described.

As the negative electrode current collector 102, a material having high conductivity such as copper, stainless steel, iron, or nickel can be used. The negative electrode current collector 102 can have a foil shape, a plate shape, a film shape, or the like as appropriate.

The negative electrode active material layer 103 is formed using a material capable of lithium-ion occlusion and emission. Typically, lithium, aluminum, graphite, silicon, tin, germanium, or the like is used. In the case where the negative electrode active material layer 103 has sufficient conductivity for also functioning as the negative electrode current collector 102, the negative electrode active material layer 103 may double as the negative electrode current collector 102. In other words, in the case where the negative electrode active material layer 103 has sufficient conductivity for also functioning as the negative electrode current collector 102, the negative electrode active material layer 103 may be used alone as the negative electrode 101.

The theoretical lithium occlusion capacity is larner in germanium, silicon, lithium, and aluminum than in graphite. When the occlusion capacity is large, charge and discharge can be performed sufficiently even in a small area and a function of a negative electrode can be obtained, so that reduction in cost and size of a secondary battery can be achieved. However, in the case of silicon or the like, the volume is approximately quadrupled due to lithium occlusion; therefore, the probability that the material itself gets vulnerable should be considered.

Note that when a material other than lithium is used for the negative electrode active material layer 103, the negative electrode active material layer 103 may be predoped with lithium. Predoping with lithium may be performed in such a manner that a lithium layer is formed over a surface of the negative electrode active material layer 103 by a sputtering method. Alternatively, lithium foil is provided over the surface of the negative electrode active material layer 103, whereby the negative electrode active material layer 103 can be predoped with lithium. Note that in this specification, a negative electrode active material layer predoped with lithium is also referred to as a negative electrode active material layer.

The desired thickness of the negative electrode active material layer 103 is determined in the range of 100 nm to 100 μm.

Note that the negative electrode active material layer 103 may include a binder and a conduction auxiliary agent. Further, a layer which facilitates contact between the negative electrode active material layer 103 and the electrolyte 121 may be provided over the surface of the negative electrode active material layer 103.

Examples of the binder include polysaccharides, thermoplastic resins, and polymers with rubber elasticity. For example, starch, carboxymethylcellulose, hydroxypropylcellulose, regenerated cellulose, diacetylcellulose, polyvinylchloride, polyvinylpyrrolidone, polytetrafluoroethylene, polyvinylide fluoride, polyethylene, polypropylene, ethylene-propylene-diene monomer (EPDM), sulfonated EPDM, styrene-butadiene rubber, butadiene rubber, fluorine rubber, or the like can be used. Alternatively, polyimide, polyvinyl alcohol, polyethylene oxide, or the like may be used.

As the conduction auxiliary agent, a material which is itself an electron conductor and does not cause chemical reaction with other materials in the power storage device may be used. For example, carbon-based materials such as graphite, carbon fiber, carbon black, acetylene black, and VGCF (registered trademark); metal materials such as copper, nickel, aluminum, and silver; and powder, fiber, the like of mixtures thereof can be given. The conduction auxiliary agent is a material that assists conductivity between active materials; it is provided between active materials which are apart from each other and makes conduction between the active materials.

For the negative electrode active material layer 103 according to this embodiment, the material capable of lithium-ion occlusion and emission which is described above may be deposited to form a film over the negative electrode current collector 102 by a sputtering method or the like. Further, the film formed using the material capable of lithium-ion occlusion and emission may be predoped with lithium in the aforementioned manner.

Alternatively, the negative electrode active material layer 103 according to this embodiment may be formed in such a manner that the above material capable of lithium-ion occlusion and emission, the binder, the conduction auxiliary agent, and an organic solvent are mixed to form slurry, the slurry is formed over the negative electrode current collector 102, and drying and baking are performed. In the case where the negative electrode active material layer 103 according to this embodiment is thus formed, after the formation of the slurry, the drying, and the baking, the negative electrode active material layer 103 may be predoped with lithium.

Next, the electrolyte 121 included in the power storage device 100 in this embodiment will be described.

As a solute of the electrolyte 121, a material in which lithium ions that are carrier ions can transfer and exist stably is used as appropriate.

Typical examples of the solute of the electrolyte 121 include lithium salts such as $LiPF_6$, $LiClO_4$, $LiAsF_6$, $LiBF_4$, and $Li(C_2F_5SO_2)_2N$.

As the solvent of the electrolyte 121, a material in which lithium ions can transfer is used. As the solvent of the electrolyte 121, an aprotic organic solvent is preferably used. Typical examples of aprotic organic solvents include ethylene carbonate, propylene carbonate, dimethyl carbonate, diethyl carbonate, γ-butyrolactone, acetonitrile, dimethoxyethane, tetrahydrofuran, and the like, and one or more of these materials can be used.

In the case where the solvent of the electrolyte 121 is a liquid with low viscosity, the separator to be described later is impregnated with the electrolyte 121 and the separator is provided between the positive electrode 111 and the negative electrode 101, more specifically, provided in contact with the negative electrode active material layer 103 and the positive electrode active material layer 113.

When a gel is used instead of the solvent in the electrolyte 121, safety against liquid leakage and the like is improved. Further, a lithium-ion secondary battery can be thinner and more lightweight. Typical examples of the gel include a silicon gel, an acrylic gel, an acrylonitrile gel, a polyethylene oxide gel, a polypropylene oxide gel, a fluorine-based polymer gel, and the like.

When a gel is used instead of the solvent in the electrolyte 121, the separator is not necessarily provided. Whether the separator is provided may be determined depending on the gel. In the case where the separator is not provided, the electrolyte 121 itself is provided between the positive electrode 111 and the negative electrode 101, more specifically, provided in contact with the negative electrode active material layer 103 and the positive electrode active material layer 113.

As the electrolyte 121, a solid electrolyte such as $Li_3PO_4$ can be used. Also in the case where such a solid electrolyte is used as the electrolyte 121, the electrolyte 121 itself can be provided between the positive electrode 111 and the negative electrode 101.

As the separator, an insulating porous material is used. Typical examples of the separator include cellulose (paper), polyethylene, and polypropylene.

The charge and discharge characteristics of the power storage device described above will be described with reference to FIGS. 5A to 5C.

The power storage devices according to this embodiment include the positive electrodes 111 in which titanium films each with a thickness of 100 μm were used as the positive electrode current collectors 112, and lithium cobalt oxide layers were each formed as the positive electrode active material layer 113 to a thickness of 100 nm while the positive electrode current collectors 112 were heated at 300° C., 400° C., and 500° C. FIG. 2 shows results of XRD measurement of the lithium cobalt oxide layer.

Charge and discharge measurement of the power storage devices according to this embodiment was performed with a charge/discharge tester TOSCAT-3100 manufactured by TOYO SYSTEM CO., LTD. The range of measurement voltage was set to 2.5 V to 4.2 V. At the time of charging, constant-current constant-voltage (CCCV) measurement was conducted where charging is performed at a predetermined current and when a predetermined voltage (4.2 V in this embodiment) is reached, the charging is continued at the predetermined voltage. At the time of discharging, constant current (CC) measurement was conducted where charging is performed at a predetermined current.

The value of the constant current was 1 μA, and when the current value reached 0.1 μA after the constant voltage was fixed, the measurement was finished. The cessation time of charging and discharging was 2 hours. This charge and discharge measurement was conducted after three cycles of constant-current charging and discharging were performed.

In the power storage device according to this embodiment, a metallic lithium (Li) film was used as the negative electrode active material layer 103. The metallic lithium (Li) film serves also as a current collector; thus, only the metallic lithium (Li) film was used as the negative electrode 101. Further, LiPF$_6$ was used as a solute of the electrolyte 121, and ethylene carbonate and diethyl carbonate were used as solvents of the electrolyte 121. As the separator impregnated with the electrolyte 121, polypropylene was used.

Figure 5A:
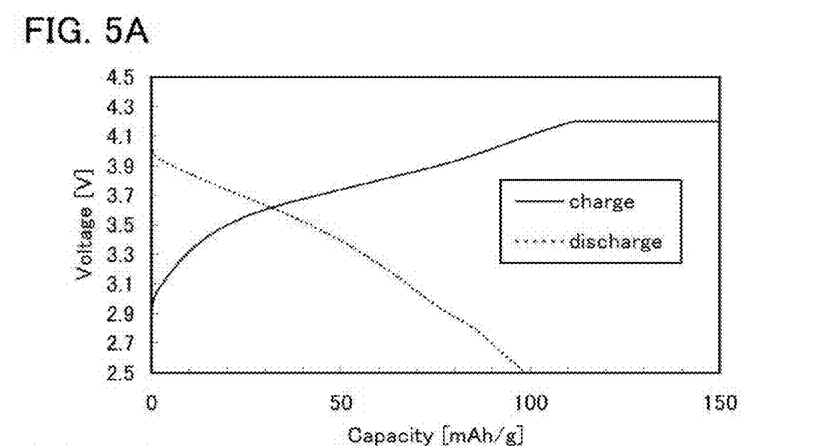
FIGS. 5A to 5C are graphs each showing the relations between capacity and charge and discharge voltage.
Figure 5B:
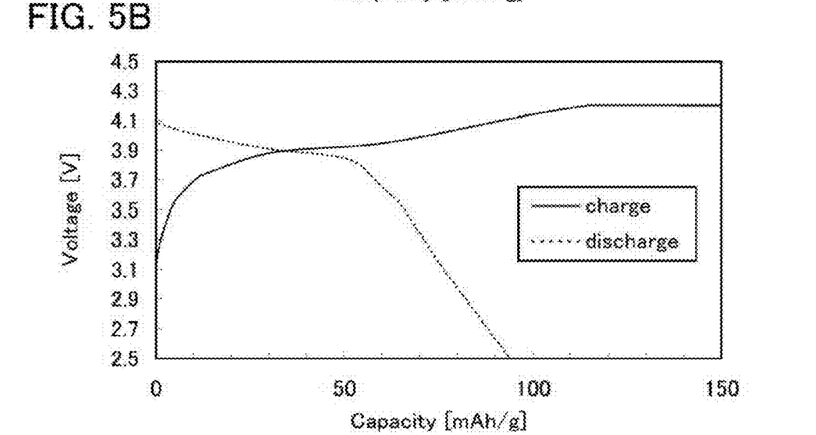
Figure 5C:
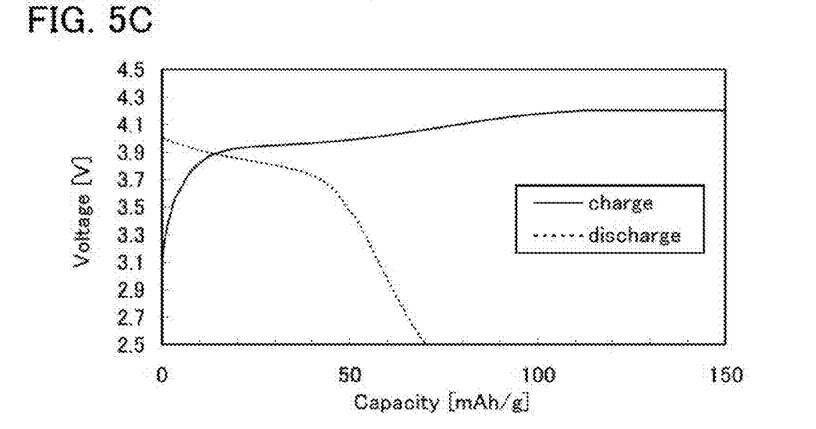

FIGS. 5A, 5B, and 5C show the relations between capacity and charge and discharge voltage in the cases where the heating temperatures were 300° C., 400° C., and 500° C. The maximum discharge capacities at respective heating temperatures were 98.7 mAh/g, 94 mAh/g, and 70.2 mAh/g.

In a discharge curve of FIG. 5B, a displacement point of a waveform is observed between discharge voltages of 3.6 V to 3.7 V. In a discharge curve of FIG. 5C, a displacement point of a waveform is observed between discharge voltages of 3.5 V to 3.6 V. In contrast, in FIG. 5A, a displacement point is not observed. This is because different charge and discharge reactions occur at 300° C. in FIG. 5A, 400° C. in FIG. 5B, and 500° C. in FIG. 5C.

Figure 7A:
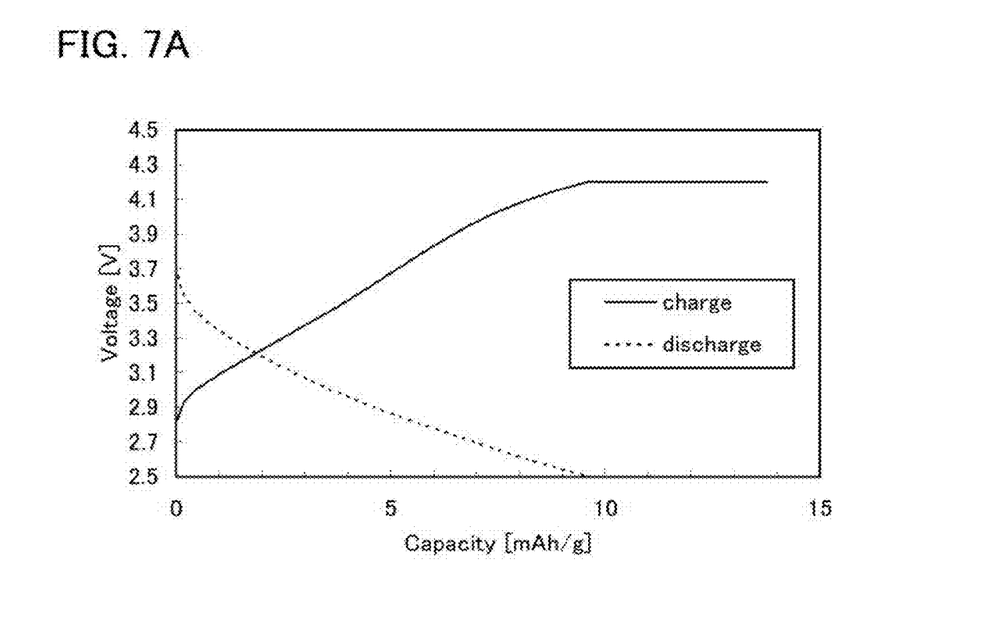
FIGS. 7A and 7B are graphs each showing the relations between capacity and charge and discharge voltage.
Figure 7B:
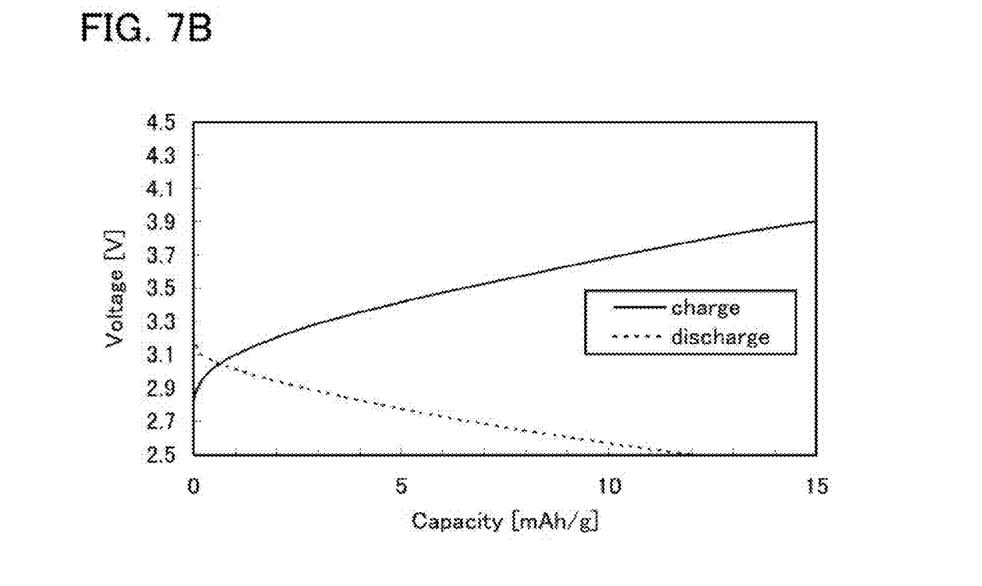

FIGS. 7A and 7B show the relations between capacity and charge and discharge voltage of power storage devices in which lithium cobalt oxide layers used in FIGS. 6A and 6B were used as the positive electrode active material layers 113. The maximum discharge capacities of the power storage devices used in FIGS. 7A and 7B were 9.6 mAh/g and 12 mAh/g, respectively.

Figure 11:
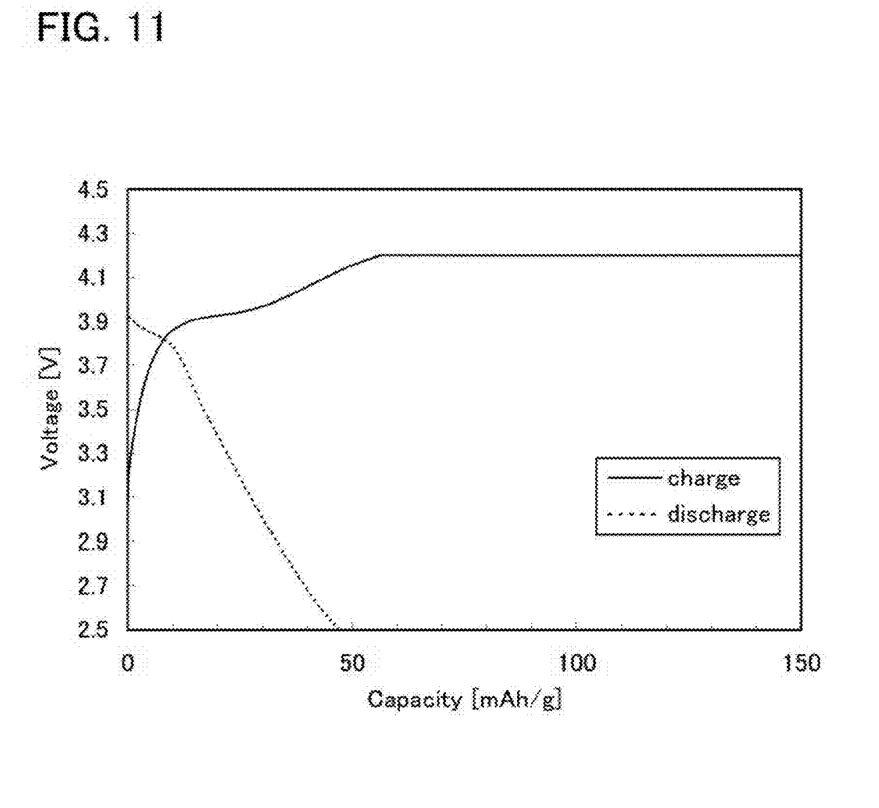
FIG. 11 is a graph showing the relations between capacity and charge and discharge voltage.

FIG. 11 shows the relations between capacity and charge and discharge voltage of a power storage device including the positive electrode 111 in which a lithium cobalt oxide layer with a thickness of 100 nm was formed as the positive electrode active material layer 113 while the titanium film with a thickness of 100 μm formed as the positive electrode current collector 112 was heated at 600° C. In FIG. 11, the maximum discharge capacity was 47 mAh/g.

FIG. 11 shows that the charge and discharge capacity, in particular, the discharge capacity of the power storage device in which a lithium cobalt oxide layer formed while being heated at 600° C. is used as the positive electrode current collector 112 was low. The charge and discharge capacity thereof was lower than that of a power storage device in which a lithium cobalt oxide layer formed while being heated at a lower temperature (at higher than or equal to 400° C. and lower than 600° C., more specifically at 400° C. (in FIG. 5B) and 500° C. (in FIG. 5C)). Further, as shown in FIGS. 7A and 7B, the charge and discharge capacity of the power storage device in which a lithium cobalt oxide layer heated at a higher temperature (600° C.) after being formed is used as the positive electrode active material layer 113 was lower than that of the power storage device in which a lithium cobalt oxide layer formed while being heated at a lower temperature (at higher than or equal to 400° C. and lower than 600° C., more specifically at 400° C. (in FIG. 5B) and 500° C. (in FIG. 5C)). The reason why the charge and discharge capacity of the power storage device in which a lithium cobalt oxide layer formed at a higher temperature (600° C.) or a lithium cobalt oxide layer heated at a higher temperature (600° C.) is used as the positive electrode active material layer 113 was thus lower than the charge and discharge capacity of the power storage device in which a lithium cobalt oxide layer heated at a lower temperature (at higher than or equal to 400° C. and lower than 600° C., more specifically at 400° C. and 500° C.) is that the lithium cobalt oxide layer is decomposed to form a decomposition product, e.g., cobalt oxide.

Therefore, when the lithium cobalt oxide layer formed while being heated at a lower temperature (at higher than or equal to 400° C. and lower than 600° C., more specifically at 400° C. and 500° C.) is used as the positive electrode active material layer 113, the power storage device can have high discharge capacity, as described in this embodiment.

According to this embodiment, decomposition of lithium cobalt oxide can be suppressed, resulting in suppression of formation of a decomposition product.

Further, according to this embodiment, it is possible to suppress the reaction between oxygen in lithium cobalt oxide and the current collector.

Furthermore, according to this embodiment, it is possible to obtain a power storage device having high charge and discharge capacity.

[Embodiment 2]

In this embodiment, a power storage device having a structure different from that in Embodiment 1 will be described.

Figure 9A:
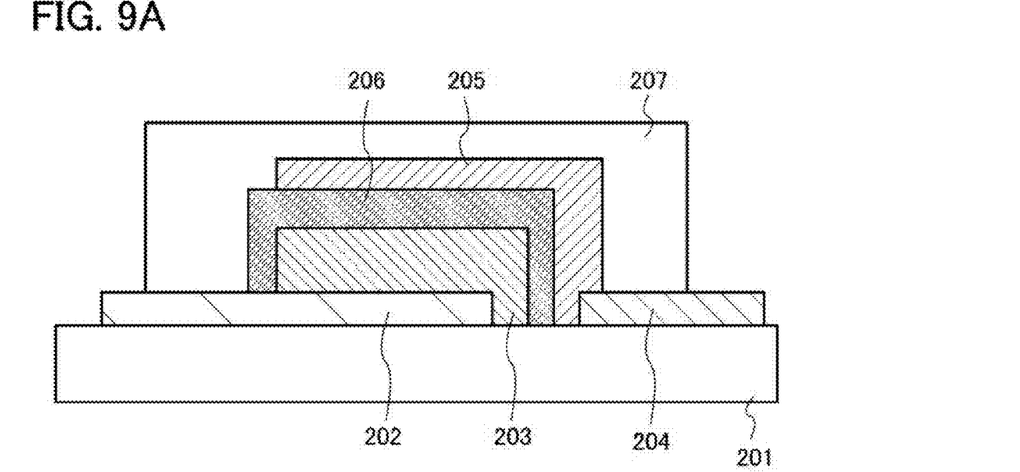
FIGS. 9A to 9C are cross-sectional views of power storage devices.

A power storage device in FIG. 9A includes a substrate 201, and a positive electrode current collector 202 and a negative electrode current collector 204 which are over the substrate 201. A positive electrode active material layer 203 is formed over the substrate 201 and the positive electrode current collector 202. A solid electrolyte layer 206 is formed in contact with the positive electrode current collector 202 so as to cover the positive electrode active material layer 203. A negative electrode active material layer 205 is formed in contact with the solid electrolyte layer 206 and the negative electrode current collector 204. A protective film 207 is formed in contact with the positive electrode current collector 202 and the negative electrode current collector 204 so as to cover the solid electrolyte layer 206 and the negative electrode active material layer 205.

Figure 9B:
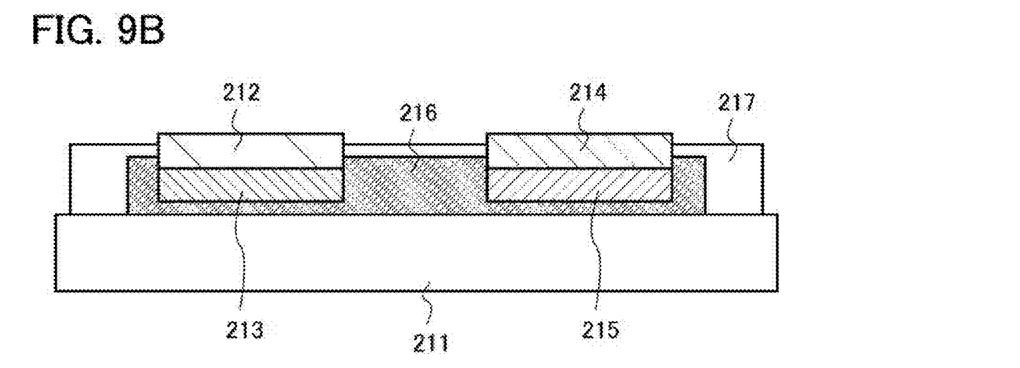

A power storage device in FIG. 9B includes a substrate 211, a solid electrolyte layer 216 over the substrate 211, and a positive electrode active material layer 213 and a negative electrode active material layer 215 which are in contact with the solid electrolyte layer 216. A positive electrode current collector 212 is formed over the positive electrode active material layer 213 so as to be in contact with the solid electrolyte layer 216, and a negative electrode current collector 214 is formed over the negative electrode active material layer 215 so as to be in contact with the solid electrolyte layer 216. A protective film 217 is formed so as to cover the solid electrolyte layer 216.

Figure 9C:
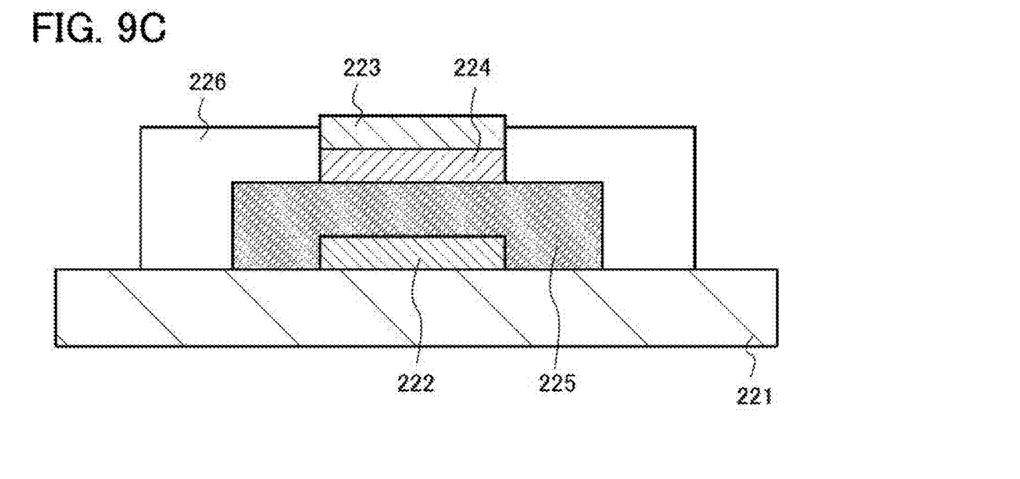

In a power storage device in FIG. 9C, a positive electrode active material layer 222 is formed over a positive electrode current collector 221. A solid electrolyte layer 225 is formed so as to cover the positive electrode active material layer 222. A negative electrode active material layer 224 and a negative electrode current collector 223 are formed over the solid electrolyte layer 225. A protective film 226 is formed over the positive electrode current collector 221 so as to be in contact with the negative electrode current collector 223 and cover the solid electrolyte layer 225 and the negative electrode active material layer 224.

As the substrate 201 in FIG. 9A and the substrate 211 in FIG. 9B, for example, a glass substrate, a quartz substrate, or a mica substrate is used.

The positive electrode current collector 202 in FIG. 9A, the positive electrode current collector 212 in FIG. 9B, and the positive electrode current collector 221 in FIG. 9C are each similar to the positive electrode current collector 112 in Embodiment 1.

The positive electrode active material layer 203 in FIG. 9A, the positive electrode active material layer 213 in FIG. 9B, and the positive electrode active material layer 222 in FIG. 9C are each similar to the positive electrode active material layer 113 in Embodiment 1.

The negative electrode current collector 204 in FIG. 9A, the negative electrode current collector 214 in FIG. 9B, and the negative electrode current collector 223 in FIG. 9C are each similar to the negative electrode current collector 102 in Embodiment 1.

As a material of each of the negative electrode active material layer 205 in FIG. 9A, the negative electrode active material layer 215 in FIG. 9B, and the negative electrode active material layer 224 in FIG. 9C, $TiO_2$, $Li_4Ti_5O_{12}$, $Nb_2O_5$, $NbTiO_x$, $WO_2$, $MoO_2$, silicon, a silicon alloy, germanium, a germanium alloy, tin, a tin alloy, or metallic lithium can be used (x is a positive real number). Each of the negative electrode active material layers is formed to have a film shape with the use of the above material by a PVD method (sputtering or deposition), a PLD method (pulsed laser), or an AD method (aerosol deposition).

The desired thicknesses of the negative electrode active material layer 205 in FIG. 9A, the negative electrode active material layer 215 in FIG. 9B, and the negative electrode active material layer 224 in FIG. 9C are determined in the range of 100 nm to 100 μm.

In the case where a material other than metallic lithium is used as a material of each of the negative electrode active material layer 205 in FIG. 9A, the negative electrode active material layer 215 in FIG. 9B, and the negative electrode active material layer 224 in FIG. 9C, the negative electrode active material layers may be predoped with lithium. For example, in the case where the negative electrode active material layer is formed by a deposition method, the negative electrode active material layer may be predoped with lithium with the use of the above material and the lithium as deposition sources. Note that in this specification, a negative electrode active material layer predoped with lithium is also referred to as a negative electrode active material layer.

Note that a layer which facilitates contact between the negative electrode active material layer and the solid electrolyte layer may be provided over a surface of the negative electrode active material layer.

As a material of each of the solid electrolyte layer 206 in FIG. 9A, the solid electrolyte layer 216 in FIG. 9B, and the solid electrolyte layer 225 in FIG. 9C, an oxide material such as $Li_3PO_4$, $Li_3PO_4$—$_xN_x$, $Li_{1.3}Al_{0.3}Ti_{1.7}P_3O_{12}$, $Li_{0.35}La_{0.55}TiO_3$, $Li_{14}ZnGe_4O_{16}$, $Li_6BaLa_2Ta_2O_{12}$, or $Li_7La_3Zr_2O_{12}$, or a sulfide material such as $Li_xPS_y$, $Li_2S$—$SiS_2$—$Li_3PO_4$, $Li_2S$—$SiS_2$—$Li_4SiO_4$, or $Li_{3.25}Ge_{0.25}P_{0.75}S_4$ can be used (x and y are positive real numbers).

Each of the solid electrolyte layers is formed with the use of the above material by a deposition method, a PVD method (sputtering or deposition), a PLD method (pulsed laser), or an AD method (aerosol deposition). Note that the shape of each of the solid electrolyte layers may be a film shape, a pellet shape, or a plate shape.

As each of the protective film 207 in FIG. 9A, the protective film 217 in FIG. 9B, and the protective film 226 in FIG. 9C, a silicon nitride film, a silicon nitride oxide film, a silicon oxide film, a silicon oxynitride film, a fluorine-based resin, or diamond-like carbon (DLC) can be used.

This embodiment can be implemented in appropriate combination with the above embodiment.

This application is based on Japanese Patent Application serial no. 2011-090685 filed with the Japan Patent Office on Apr. 15, 2011, the entire contents of which are hereby incorporated by reference.

What is claimed is:

1. A method for manufacturing a power storage device, comprising:
   forming a lithium cobalt oxide layer over a positive electrode current collector by a sputtering method using a target comprising lithium cobalt oxide and a sputtering gas comprising Ar while the positive electrode current collector is heated at a temperature higher than or equal to 400° C. and lower than 600° C.

2. The method for manufacturing a power storage device, according to claim 1,
   wherein c-axes of crystals of lithium cobalt oxide are aligned in the lithium cobalt oxide layer, and
   wherein cobalt oxide is not formed by heating the positive electrode current collector.

3. The method for manufacturing a power storage device, according to claim 1,
   wherein a material of the positive electrode current collector is one selected from the group consisting of titanium, stainless steel, platinum, and aluminum.

4. The method for manufacturing a power storage device, according to claim 1,
   wherein a material of the positive electrode current collector is titanium.

5. The method for manufacturing a power storage device, according to claim 1,
   wherein a material of the positive electrode current collector is stainless steel.

6. The method for manufacturing a power storage device, according to claim 1, further comprising:
   forming the positive electrode current collector and a negative electrode current collector over a substrate before forming the lithium cobalt oxide layer;
   forming a solid electrolyte layer in contact with the positive electrode current collector and covering the lithium cobalt oxide layer;

forming a negative electrode active material layer in contact with the solid electrolyte layer and the negative electrode current collector; and forming a protective film in contact with the positive electrode current collector and the negative electrode current collector and covering the solid electrolyte layer and the negative electrode active material layer.

7. The method for manufacturing a power storage device, according to claim 6,
wherein a material of the negative electrode current collector is one selected from the group consisting of copper, stainless steel, iron, and nickel.

8. The method for manufacturing a power storage device, according to claim 6,
wherein a material of the solid electrolyte layer is one of $Li_3PO_4$, $Li_3PO_{4-x}N_x$, $Li_{1.3}Al_{0.3}Ti_{1.7}P_3O_{12}$, $Li_{0.35}La_{0.55}TiO_3$, $Li_{14}ZnGe_4O_{16}$, $Li_6BaLa_2Ta_2O_{12}$, $Li_7La_3Zr_2O_{12}$, $Li_xPS_y$, $Li_2S$—$SiS_2$—$Li_3PO_4$, $Li_2S$—$SiS_2$—$Li_4SiO_4$, and $Li_{3.25}Ge_{0.25}P_{0.75}S_4$, and
wherein x and y are positive real numbers.

9. The method for manufacturing a power storage device, according to claim 6,
wherein a material of the negative electrode active material layer is one of $TiO_2$, $Li_4Ti_5O_{12}$, $Nb_2O_5$, $NbTiO_x$, $WO_2$, $MoO_2$, silicon, a silicon alloy, germanium, a germanium alloy, tin, a tin alloy, and metallic lithium.

10. The method for manufacturing a power storage device, according to claim 6,
wherein the protective film is one of a silicon nitride film, a silicon nitride oxide film, a silicon oxide film, a silicon oxynitride film, a fluorine-based resin, and diamond-like carbon.

11. The method for manufacturing a power storage device, according to claim 1, further comprising:
forming a solid electrolyte layer covering the lithium cobalt oxide layer;
forming a negative electrode active material layer in contact with the solid electrolyte layer;
forming a negative electrode current collector over the negative electrode active material layer; and
forming a protective film in contact with the positive electrode current collector, the solid electrolyte layer, the negative electrode active material layer, and the negative electrode current collector.

12. A method for manufacturing a positive electrode, comprising:
forming a lithium cobalt oxide layer on one of titanium and stainless steel as a positive electrode current collector by a sputtering method using a target comprising lithium cobalt oxide and a sputtering gas comprising Ar while the positive electrode current collector is heated at a temperature higher than or equal to 400° C. and lower than 600° C.

13. A method for manufacturing a power storage device, comprising:
forming the positive electrode according to claim 12.

14. A method for manufacturing a power storage device, comprising:
forming the positive electrode according to claim 12 and a negative electrode current collector over a substrate;
forming a solid electrolyte layer in contact with the positive electrode current collector and covering the lithium cobalt oxide layer;
forming a negative electrode active material layer in contact with the solid electrolyte layer and the negative electrode current collector; and
forming a protective film in contact with the positive electrode current collector and the negative electrode current collector and covering the solid electrolyte layer and the negative electrode active material layer.

15. The method for manufacturing a power storage device, according to claim 14,
wherein a material of the negative electrode current collector is one selected from the group consisting of copper, stainless steel, iron, and nickel.

16. The method for manufacturing a power storage device, according to claim 14,
wherein a material of the solid electrolyte layer is one of $Li_3PO_4$, $Li_3PO_{4-x}N_x$, $Li_{1.3}Al_{0.3}Ti_{1.7}P_3O_{12}$, $Li_{0.35}La_{0.55}TiO_3$, $Li_{14}ZnGe_4O_{16}$, $Li_6BaLa_2Ta_2O_{12}$, $Li_7La_3Zr_2O_{12}$, $Li_xPS_y$, $Li_2S$—$SiS_2$—$Li_3PO_4$, $Li_2S$—$SiS_2$—$Li_4SiO_4$, and $Li_{3.25}Ge_{0.25}P_{0.75}S_4$, and
wherein x and y are positive real numbers.

17. The method for manufacturing a power storage device, according to claim 14,
wherein a material of the negative electrode active material layer is one of $TiO_2$, $Li_4Ti_5O_{12}$, $Nb_2O_5$, $NbTiO_x$, $WO_2$, $MoO_2$, silicon, a silicon alloy, germanium, a germanium alloy, tin, a tin alloy, and metallic lithium.

18. The method for manufacturing a power storage device, according to claim 14,
wherein the protective film is one of a silicon nitride film, a silicon nitride oxide film, a silicon oxide film, a silicon oxynitride film, a fluorine-based resin, and diamond-like carbon.

19. A method for manufacturing a power storage device, comprising:
forming the positive electrode according to claim 12;
forming a solid electrolyte layer over the lithium cobalt oxide layer;
forming a negative electrode active material layer in contact with the solid electrolyte layer;
forming a negative electrode current collector over the negative electrode active material layer; and
forming a protective film in contact with the positive electrode current collector, the solid electrolyte layer, the negative electrode active material layer, and the negative electrode current collector.

* * * * *